US008311503B2

(12) United States Patent
Karacaoglu et al.

(10) Patent No.: US 8,311,503 B2
(45) Date of Patent: Nov. 13, 2012

(54) RADIO FREQUENCY FILTERING IN COAXIAL CABLES WITHIN A COMPUTER SYSTEM

(75) Inventors: Ulun Karacaoglu, San Diego, CA (US); Songnan Yang, San Jose, CA (US); Xintian E Lin, Palo Alto, CA (US); Anand S Konanur, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 223 days.

(21) Appl. No.: 12/590,353

(22) Filed: Nov. 6, 2009

(65) Prior Publication Data

US 2011/0111709 A1 May 12, 2011

(51) Int. Cl.
*H04B 1/06* (2006.01)
*H01P 1/202* (2006.01)

(52) U.S. Cl. ..................... 455/275; 455/276.1; 333/206; 333/166

(58) Field of Classification Search .................. 455/272, 455/276.1, 282, 286, 339, 275; 333/160, 333/23, 206, 156, 166, 167, 176, 178, 207
See application file for complete search history.

(56) References Cited

U.S. PATENT DOCUMENTS

| | | | | |
|---|---|---|---|---|
| 3,317,830 | A | 5/1967 | Winningstad | |
| 3,349,479 | A | 10/1967 | Sewell | |
| 3,452,429 | A | 7/1969 | Liebscher | |
| 3,711,942 | A | 1/1973 | Reynolds | |
| 4,266,204 | A * | 5/1981 | Jacoby | 333/28 R |
| 4,266,207 | A * | 5/1981 | Schafer | 333/206 |
| 4,296,389 | A * | 10/1981 | Fuller et al. | 333/160 |
| 4,310,816 | A * | 1/1982 | Fuller | 333/156 |
| 4,329,667 | A * | 5/1982 | Schafer | 333/206 |
| 4,446,566 | A * | 5/1984 | Fuller | 375/343 |
| 2003/0050032 | A1* | 3/2003 | Masaki | 455/272 |
| 2004/0018815 | A1* | 1/2004 | Lin et al. | 455/73 |
| 2007/0281542 | A1* | 12/2007 | Palinkas et al. | 439/585 |
| 2012/0082068 | A1* | 4/2012 | Yang et al. | 370/277 |

* cited by examiner

*Primary Examiner* — Blane J Jackson
(74) *Attorney, Agent, or Firm* — Forefront IP Lawgroup, PLLC

(57) ABSTRACT

Embodiments and methods and means for filtering radio frequencies (RF) via coaxial cables with a computer system are provided. Such embodiments generally include modifying an RF coaxial cables communicatively coupling an antenna to a wireless radio module within a mobile computing device allow an RF signal within certain frequency band(s) to pass with minimal attenuation while other frequencies, the RF signal is either reflected or attenuated. Modifying the RF coaxial cable entails inserting sections of varied impedance into the uniform impedance of the RF coaxial cable by altering the mechanical structure of the RF coaxial cable.

13 Claims, 6 Drawing Sheets

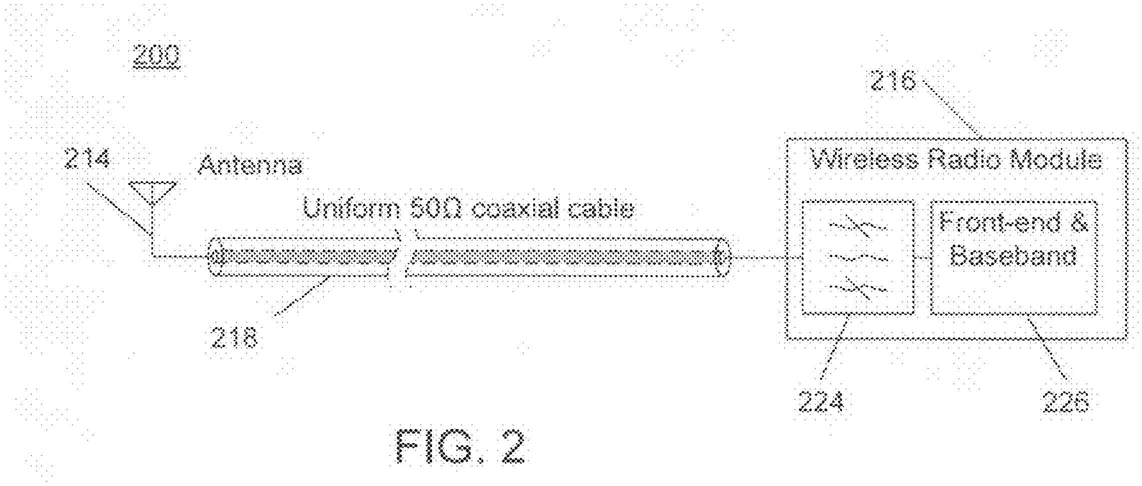
FIG. 2
FIG. 3
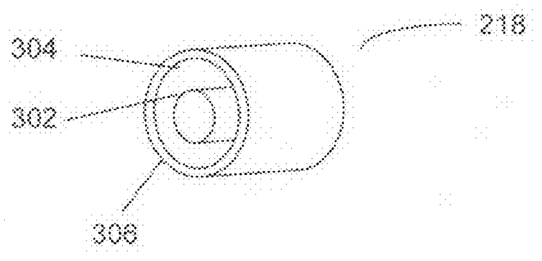

RADIO FREQUENCY FILTERING IN COAXIAL CABLES WITHIN A COMPUTER SYSTEM

BACKGROUND

Typically two radios co-located on the same computer platform, particularly laptops, notebook and netbook computer systems, need high isolation to function optimally. This high isolation between the two radios prevents the two radios from interfering with the other radio's reception. Conventionally, this essential isolation is typically achieved through a high isolation between the two radios' antennas and highly selective filters on the radio receiver side of conventional radio architecture.

As more and more radios and antennas are integrated in a computer system, there is an increasing difficulty in achieving a high isolation between closely spaced antennas. As a result, a more stringent filter requirement is forced upon the wireless module. However, due to cost and real estate constraints, the performance of the front-end filter on the wireless module is usually compromised. Consequently a major portion of radio co-existence issues in current computer systems, and more particularly mobile computing systems such as laptops, notebooks and netbooks, are caused by front-end saturation due to strong out-of-bound (OOB) interference from other embedded radios operating at a nearby frequency band.

Additionally, in a computer system comprising a single radio, excessive filtering is usually required to reject spurious emission of transmission in order to obtain regulatory compliance. This filtering is sometimes found to be inadequate in a radio module prototype or hard to achieve on a low cost radio solution. Currently, to solve these problems at a modular level usually incurs significant cost increases and time to market delays.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

FIG. 2 illustrates conventional radio architecture.

FIG. 3 illustrates an in-line-filter radio architecture in accordance with one embodiment.

DETAILED DESCRIPTION

In the following discussion, an exemplary environment is first described that is operable to employ radio frequency (RF) filtering in RF coaxial cables. Exemplary devices and procedures are then described that may be employed in the exemplary environment, as well as in other environments.

Exemplary Embodiment

Figure 1:
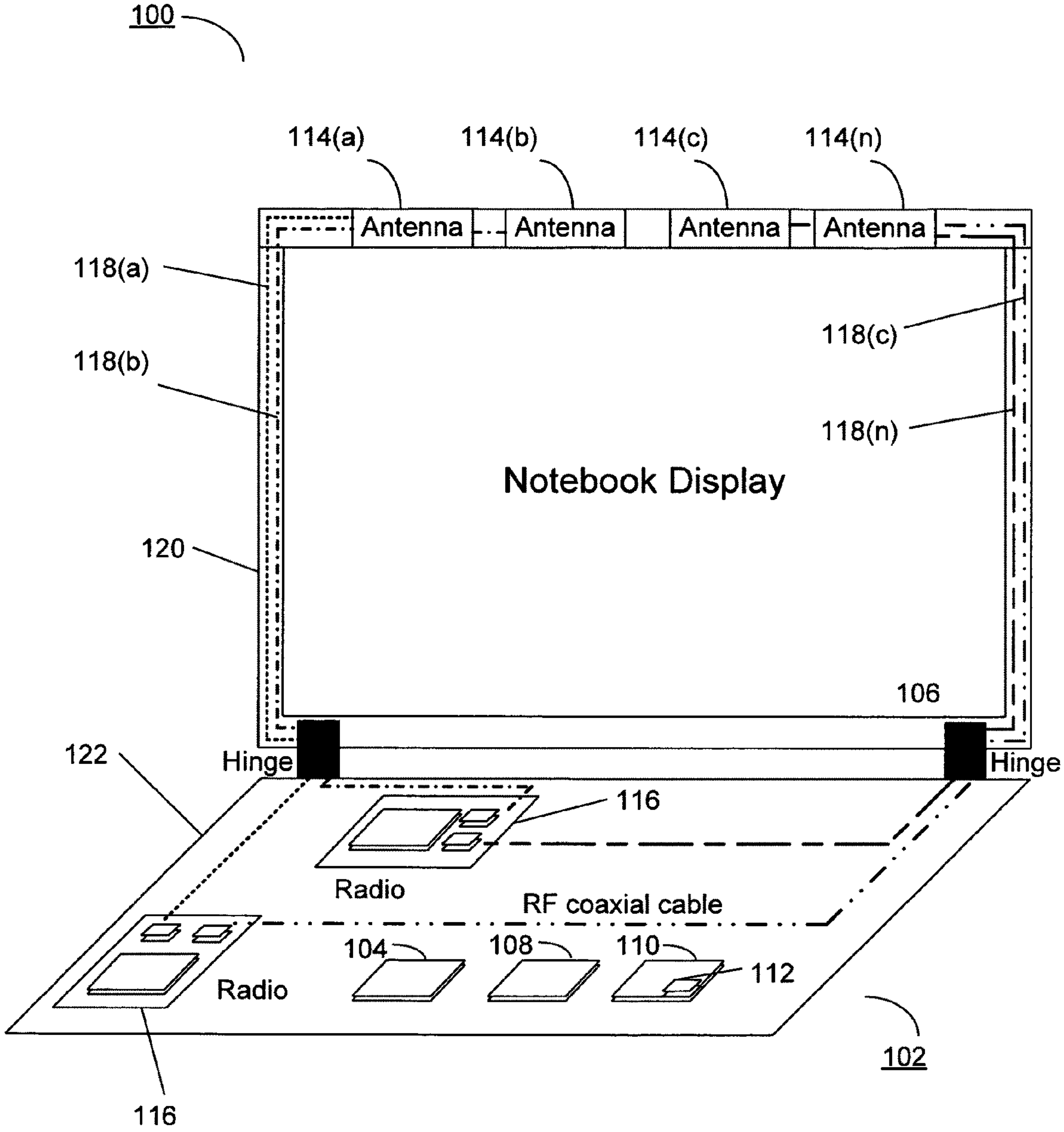
FIG. 1 illustrates a typical notebook computer system having multiple wireless radio modules and multiple antennas.

FIG. 1 illustrates an exemplary implementation of an environment 100 that is operable to employ radio frequency (RF) filtering in RF coaxial cables described herein. The environment 100 is depicted as having a computing device 102 which includes a processor core 104. Computing device 102 represents a variety of host devices/systems which may be configured in a variety of ways including but not limited to a desktop personal computer (PC), a laptop, an ultra mobile pc (UMPC), a handheld computing device, a game console, a multimedia appliance, a digital recording device for audio/video, and so forth. The processor core 104 represents a processing unit of any type of architecture which has the primary logic, operation devices, controllers, memory systems, and so forth of the computing device 102. For instance, the processor core 104 may incorporate one or more processing devices and a chipset having functionality for memory control, input/output control, graphics processing, and so forth.

In an implementation, the processor core 104 may be communicatively coupled via an interconnect (not shown) to a network interface device, a display device 106 (e.g., a liquid crystal display), and/or a plurality of input/output (I/O) devices. The interconnect represents the primary high speed interconnects between components/devices of the host computing device 102, such as those employed in traditional computing chipsets. The interconnect may be point-to-point or connected to multiple devices (e.g., bussed).

The network interface device 108 represents functionality to provide the computing device 102 a connection to one or more networks, such as the Internet, an intranet, a peer-to-to peer network, and so on. The network interface 108 may be configured to provide a wireless and/or wired connection, and to perform a variety of signal processing functions associated with network communications.

The display 110 may be configured in variety of ways including but not limited to a conventional monitor, a liquid crystal display (LCD), a projector, and so forth. The I/O devices represent a variety of I/O devices which may be provided to perform I/O functions, examples of which include controllers/devices for input functions (e.g., keyboard, mouse, trackball, pointing device), media cards (e.g., audio, video, graphic), network cards and other peripheral controllers, LAN cards, speakers, camera, and so forth.

Processor core 104 may also be coupled via a memory bus (not shown) to a memory 108 which in an embodiment represents "main" memory of the computing device 102 and which may be utilized to store and/or execute system code and data. The "main" memory 108 may be implemented with dynamic random access memory (DRAM), static random access memory (SRAM), or any other types of memories including those that do not need to be refreshed. The "main" memory 108 may include multiple channels of memory devices such as DRAMs. The DRAMs may include Double Data Rate (DDR2) devices.

Other memory 110 may also be provided which represents a variety of storage such as hard drive memory, removable media drives (for example, CD/DVD drives), card readers, flash memory and so forth. The other memory may be connected to the processor core 104 in a variety of ways such as via Integrated Drive Electronics (IDE), Advanced Technology Attachment (ATA), Serial ATA (SATA), Universal Serial Bus (USB), and so on. Other memory 110 is depicted as storing a variety of application modules 112(*m*) which may be executed via processing components and memory components to provide a variety of functionality to the computing device 102. Examples of application modules 112(*m*) include but are not limited to an operating system, a browser, office productivity modules, games, email, photo editing and storage, multimedia management/playback, and so on. A variety of other examples are also contemplated.

FIG. 1 further illustrates the computing device 102 as including multiple antennas 114(*a*) through 114(*n*), wherein the integer n represent any number of possible antennas. Each antenna 114 is communicatively coupled to a wireless radio module 116 via a radio frequency (RF) coaxial cable 118(*a*) through 118(*n*). Conventionally, each antenna 114 is located within a notebook computer system at the top of the lid 120 while the wireless radio modules 116 are located within the base 122.

Reference is now made to FIG. 2. FIG. 2 depicts a radio structure 200. The radio structure 200 comprises an antenna 214 communicatively coupled to the wireless radio module 216 via a uniform RF coaxial cable 218. Uniform RF coaxial cable 218 provides a uniform impedance of 50Ω along the length of the RF coaxial cable 218. The wireless radio module 216 includes band pass filter 224 with stringent specifications to reject out of band interference from non-desired radio frequencies. Additionally, the wireless radio module 216 will further include additional front-end and baseband filters 226.

Referring now to FIG. 3, Uniform RF coaxial cable 218 is an electrical cable with an inner conductor 302 surrounded by a tubular insulating layer 304 typically of a flexible material with a high dielectric constant. Both the inner conductor 302 and the insulating layer 304 are surrounded by a conductive layer 306 (also referred to as the metallic shield). Typically, the conductive layer 306 comprises a fine woven wire or a thin metallic foil. The three layers are then covered with a thin insulating layer (not shown). Generally, the impedance of the coaxial cable is determined from the ratio of the inner conductor's 302 diameter to the inner diameter of the conductive layer 306.

The length of an RF coaxial cable has little to do with the impedance of the RF coaxial cable. Instead, impedance is determined by the size and spacing of the conductors and the type of dielectric used between them. For ordinary coaxial cable used at a reasonable frequency, the characteristic impedance depends on the dimensions of the inner and outer conductors, and on the characteristics of the dielectric material between the inner and outer conductors. The following formula can be used for calculating the characteristic impedance of the coaxial cable:

$$\text{impedance}=(138/e\hat{\ }(1/2))*\log(D/d)$$

Wherein log equals the logarithm of 10 and d equals the diameter of the inner conductor, D equals the inner diameter of the cable shield and e equals the dielectric constant.

To improve the isolation between multiple antennas 114 of the computing device 102, the coaxial cables 118 can be modified to incorporate band pass filter functionalities. The implementation of such "in-line-filter" provides additional filtering to the discrete filter on the wireless radio modules 116. The additional filtering thus renders improved radio coexistence performance. Additionally, in a computing device 102 having a single radio 116 and antenna 114, the additional filtering can achieve lower spurious emission, thus lowering the risk of failing individual regulatory test. For both multiple radio and single radio systems, the inclusion of additional filtering provided at the RF coaxial cable 118 can provide a cost reduction by reducing the need for a more stringent filter 224 at the wireless radio module.

In order to achieve a band bass filter response within the RF coaxial cable 118, the impedance of the RF coaxial cable 118 needs to be strategically tapered through changing the RF coaxial cable's 118 mechanical structure at periodic sections along the RF coaxial cable's 118 length. By changing the RF coaxial cable's 118 mechanical structure, the cable allows RF signals within certain frequency band(s) to pass with minimal attenuation, while in other frequencies, the RF signal is either reflected or attenuated.

Figure 4:
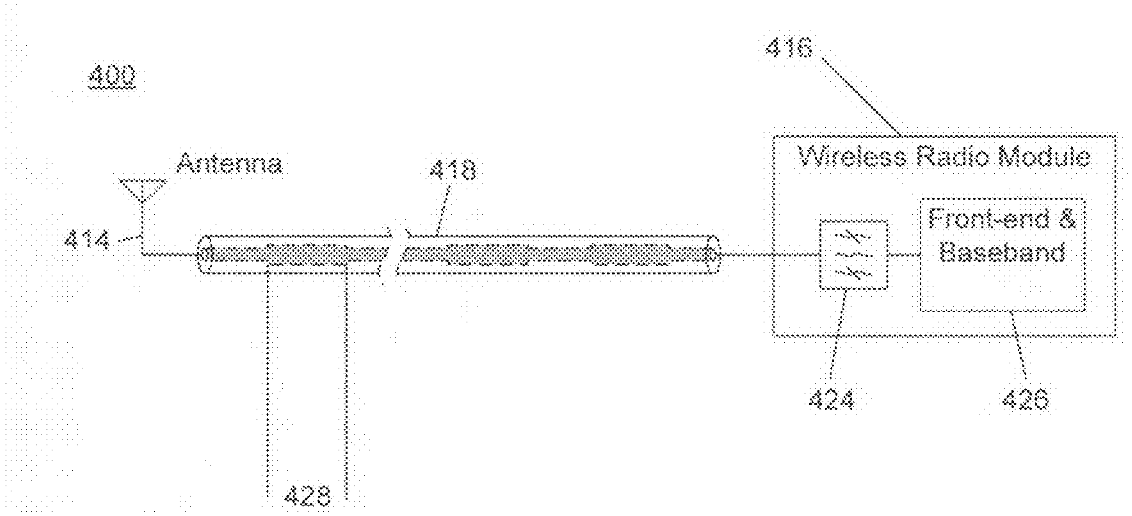
FIG. 4 illustrates a coaxial cable.

FIG. 4 depicts a conventional radio structure 400 comprising in part a modified RF coaxial cable 418. Radio structure 400 comprises an antenna 414 and a wireless radio module 416 connected via a modified RF coaxial cable 418. Modified RF coaxial cable 418 is a typical RF coaxial cable wherein the mechanical structure has been modified to allow variation in impedance along the RF coaxial cable in order to allow certain frequency band(s) to pass.

The mechanical structure of the RF coaxial cable 418 is modified by inserting sections 428 of higher and/or lower impedance along the length of the RF coaxial cable 418. The length of each section can be optimized such that the variation in cable impedance is transparent to an RF signal in another band.

Figure 5:
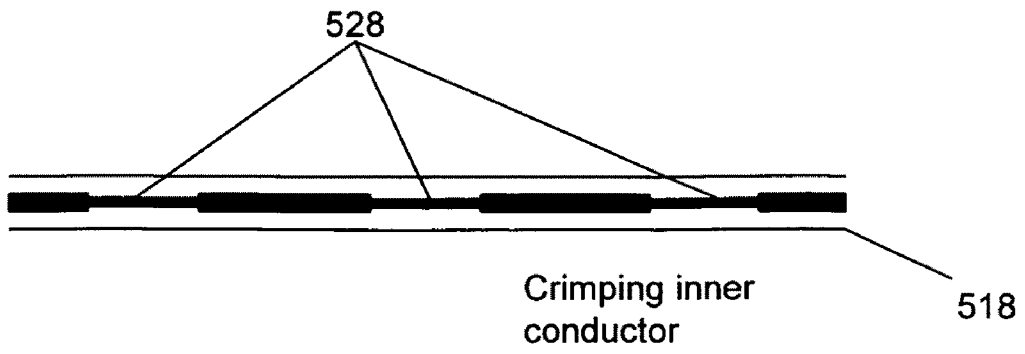
FIG. 5 illustrates a first embodiment of a modified coaxial cable.

FIG. 5 depicts a first embodiment of the modified RF coaxial cable 518 that has been modified by inserting sections 528 of altered impedance. The RF coaxial cable 518 has been modified by crimping the inner conductor of the modified RF coaxial cable 518. Wherein, crimping the inner conductor, and not modifying the conductive layer, changes the ratio of the inner conductor diameter to the diameter of the outer conductive layer, thus changing the impedance of the sections 528.

Figure 6:
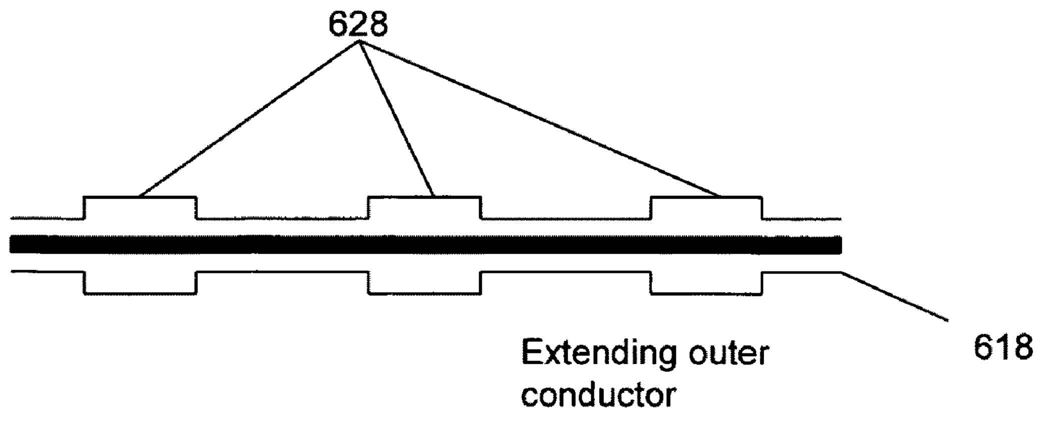
FIG. 6 illustrates a second embodiment of a modified coaxial cable.

FIG. 6 depicts a second embodiment of the modified RF coaxial cable 618 that has been modified by inserting sections 628 of altered impedance. The RF coaxial cable 618 has been modified by extending the diameter of the conductive layer. Wherein, extending the outer conductive layer, and not modifying the diameter of the inner conductor, changes the ratio of the inner conductor diameter to the diameter of the outer conductive layer, thus changing the impedance of the sections 628.

The sections of changed impedance can be modified in multiple other ways known to those of skill in the pertinent art. Additional examples of altering the impedance along the RF coaxial cable include changing materials within these sections, changing the cross-sectional shape of each conductor within the section, or changing the properties of the insulating material between the two conductors within the sections of the RF coaxial cable.

Figure 7:
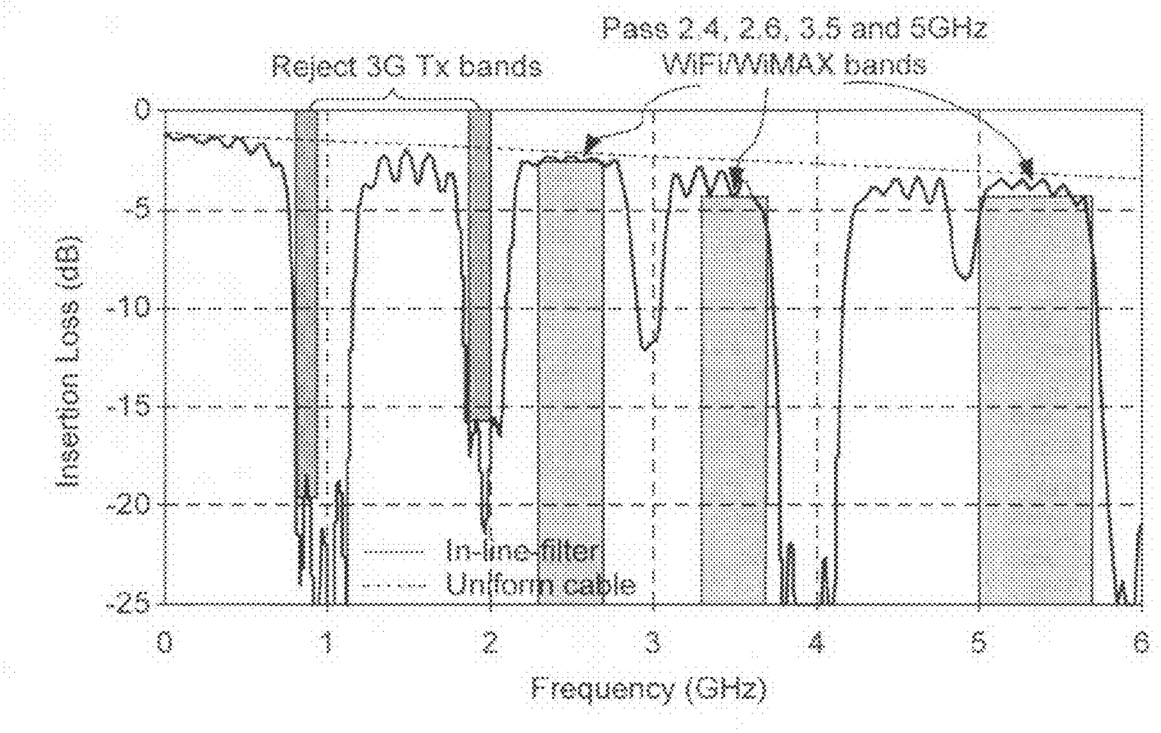
FIG. 7 illustrates an example showing a simulated insertion loss of an in-line-filter.

An example is shown in the simulated insertion loss of an in-line-filter as shown at FIG. 7. The additional embedded filter distributed along the antenna cable improves the isolation between antennas of two different radios operating at close frequency bands, lowering susceptibility to front-end saturation due to very strong Out of Band (OOB) interference signals. Additionally, the inclusion of the additional embedded filter distributed along the antenna cable improves the radio co-existence performances.

For example, the antenna cable of a 2.4 GHz WiFi radio can be designed to have a rejection band at 2 GHz to improve the antenna isolation between WiFi and 3G antennas and provide stronger rejection to uplink signal around 2 GHz transmitted by a 3G radio co-located on the same computing device platform and operating concurrently. Similarly, an in-line-filter can also be implemented to the Bluetooth radio transmitting at 2.4 GHz to limit its out of band emission in 2.5 GHz band, which could significantly degrade a WiMax radio's performance. Another usage model utilizes the in-line-filter in a DTV radio to reject 3G (700~900 MHz) uplink signal to ensure a good UHF DTV reception.

Exemplary Method

An in-line-filter as described above can be fabricated from traditional micro-coaxial cable by periodically crimping the micro-coaxial cable to achieve a changed impedance section. More particularly, the micro-coaxial cable can be modified to have section of low impedance by crimping the micro-coaxial cable to change the inner conductor's diameter relative to the diameter of the outer conductor layer.

The in-line-filter can be manufactured with variable spacing between the modified sections of the micro-coaxial cable. The more modified sections that are inserted into the fixed length of the RF coaxial cable between the antenna and the wireless radio module, the better the RF coaxial cable will act as an in-line-filter. But with the increase in the number of modified sections, the more the desired signal is lost also. The more powerful the signal, the more the RF coaxial cable can be modified as there is a greater signal power to be lost.

Figure 8:
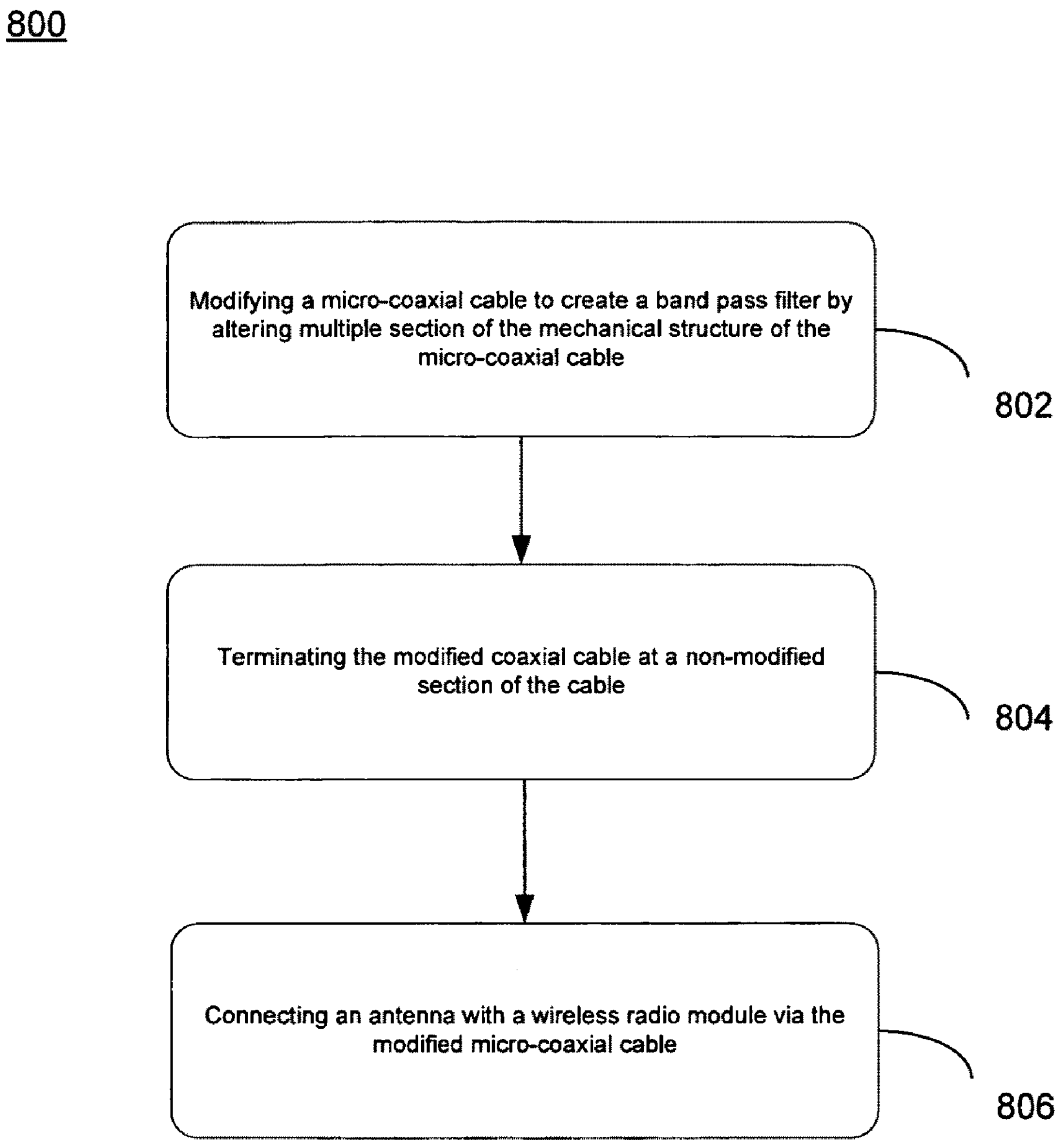
FIG. 8 illustrates method steps according to an embodiment.

FIG. 8 depicts a flowchart 800 that describes a method in accordance with one embodiment. In describing the method of flowchart 800, reference is made to the computing device 102 of FIG. 1. It is to be understood, however, that the method of flowchart 800 is contemplated to be broadly applicable to a vast range of computing devices, and is not to be limited in its use only in connection with the exemplary embodiment of FIG. 1.

At 802, a micro-coaxial cable (e.g., 118(*a*)) is modified to create an in-line-filter (i.e., a band pass filter) by altering the mechanical structure of multiple sections along the length of the micro-coaxial cable. The mechanical structure of the modified sections of the micro-coaxial cable can be achieved by altering the ratio of the outer and inner conductor diameter and/or altering the dielectric layer content between the two conductors. The micro-coaxial cables are structurally modified such that the modified sections of the micro-coaxial reflect or attenuate non-desired RF signals that might interfere with a desired RF signal carried by the modified micro-coaxial cable.

At 804, the modified micro-coaxial cable is cut to length by cutting the modified micro-coaxial cable such that the terminating ends are located within a non-modified section of the micro-coaxial cable. At step 806, the terminating ends are connected between the antenna (e.g., 114) and the wireless radio module (112).

CONCLUSION

Although the subject matter has been described in language specific to structural features and/or methodological acts, it is to be understood that the subject matter defined in the appended claims is not necessarily limited to the specific features, dimensions, or acts described. Rather, the specific features, dimensions, and acts are disclosed as illustrative forms of implementing the claims. Moreover, any of the features of any of the devices described herein may be implemented in a variety of materials or similar configurations.

What is claimed is:

1. A method of filtering radio frequencies (RF) in a computer system, the method comprising:

connecting an antenna with a radio module of the computer system via a RF coaxial cable, wherein the RF coaxial cable comprises a band pass filter designed to allow a first frequency band to pass; and strategically shaping a plurality of sections of the RF coaxial cable to change an associated impedance of the strategically shaped sections, the RF coaxial cable being terminated at a non-modified section of the plurality of sections, wherein changing the impedance of the strategically shaped section comprises changing a dielectric material between an inner conductor and a metallic shield of the RF coaxial cable.

2. The method of claim 1, wherein changing the impedance of the strategically shaped section comprises changing a ratio between an inner conductor and a metallic shield of the RF coaxial cable by altering a mechanical structure associated with the RF coaxial cable.

3. The method of claim 2, wherein changing the mechanical structure is achieved by crimping the RF coaxial cable.

4. The method of claim 1, wherein the strategically shaped sections of the RF coaxial cable are shaped such that each associated impedance is the same.

5. The method of claim 1, wherein each of the plurality of strategically shaped sections of each RF coaxial cable is uniformly spaced along the RF coaxial cable.

6. The method of claim 1, wherein the method further comprises:

connecting a second antenna with a second radio module of the computer system via a second RF coaxial cable, wherein the second RF coaxial cable comprises a second band pass filter, wherein the second band pass filter comprises a rejection band to reject the first frequency band.

7. A system of filtering radio frequencies (RF) in RF cables, the system comprising:

a first antenna;

a first receiver;

a first RF coaxial cable communicatively coupled between the first antenna and the first receiver, wherein the first coaxial cable comprises a band pass filter designed to allow a first frequency band to pass, wherein the RF cable comprises a plurality of sections, the RF coaxial cable being terminated at a non-modified section of the plurality of sections, wherein the first RF coaxial cable comprises a band pass filter by strategically shaping the plurality sections of the RF coaxial cable, wherein shaping the plurality of sections of the RF coaxial cable changes an associated impedance of each section, wherein each of the plurality of strategically shaped sections of the RF coaxial cable are shaped such that each associated impedance is different, wherein the plurality of strategically shaped sections cause the RF coaxial cable to have a tapered impedance along the RF coaxial cable.

8. The system of claim 7, wherein the first RF coaxial cable comprises a band pass filter by strategically shaping a first section of the plurality of sections associated with the first RF coaxial cable, wherein shaping the first section of the plurality of sections changes an associated impedance of the first section.

9. The system of claim 8, wherein the first section of the first RF coaxial cable is strategically shaped by altering a mechanical structure associated the first RF coaxial cable.

10. The system of claim 9, wherein altering the mechanical structure comprises crimping the first RF coaxial cable to change a spacing between an inner conductor and a metallic shield of the first RF coaxial cable.

11. A method of filtering radio frequencies (RF) in a computer system, the method comprising:

connecting an antenna with a radio module of the computer system via a RF coaxial cable, wherein the RF coaxial cable comprises a band pass filter designed to allow a first frequency band to pass; and strategically shaping a plurality of sections of the RF coaxial cable to change an associated impedance of the strategically shaped sections, wherein changing the impedance of the strategically shaped section comprises changing a dielectric material between an inner conductor and a metallic shield of the RF coaxial cable.

12. A system of filtering radio frequencies (RF) in RF cables, the system comprising:

a first antenna;

a first receiver; and a first RF coaxial cable communicatively coupled between the first antenna and the first receiver, wherein the first coaxial cable comprises a band pass filter designed to allow a first frequency band to pass, wherein the first RF coaxial cable comprises a band pass filter by strategically shaping a plurality sections of the RF coaxial cable, wherein shaping the plurality of sections of the RF coaxial cable changes an associated impedance of each section, wherein each of the plurality of strategically shaped sections of the RF coaxial cable are shaped such that each associated impedance is different, wherein the plurality of strategically shaped sections cause the RF coaxial cable to have a tapered impedance along the RF coaxial cable.

13. A system of filtering radio frequencies (RF) within a computer, the system comprising:

a first antenna;

a second antenna;

a first receiver; and a second receiver; a first RF coaxial cable communicatively coupled between the first antenna and the first receiver, wherein the first coaxial cable comprises a first band pass filter designed to allow a first frequency band to pass; a second RF coaxial cable communicatively coupled between the second antenna and the second receiver, wherein the second coaxial cable comprises a second band pass filter, wherein the second band pass filter comprises a rejection band to reject the first frequency band, wherein each RF coaxial cable comprises a band pass filter by strategically altering a first section of each RF coaxial cable, wherein altering the first section of each RF coaxial cable changes an associated impedance of each respective first section, wherein altering the impedance comprises altering the dielectric material between an inner conductor and a metallic shield of the First RF coaxial.

* * * * *